United States Patent
Cui et al.

(10) Patent No.: US 10,401,468 B2
(45) Date of Patent: Sep. 3, 2019

(54) SINGLE POSITIONING CONTROLLER AND POSITIONING CONTROL SYSTEM

(71) Applicant: HUAWEI TECHNOLOGIES CO., LTD., Shenzhen, Guangdong (CN)

(72) Inventors: Jie Cui, Shenzhen (CN); Jing Han, Beijing (CN); Anjian Li, Beijing (CN); Hong Li, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/014,551

(22) Filed: Jun. 21, 2018

(65) Prior Publication Data
US 2018/0299528 A1    Oct. 18, 2018

Related U.S. Application Data

(63) Continuation of application No. PCT/CN2015/098327, filed on Dec. 22, 2015.

(51) Int. Cl.
*H04W 64/00* (2009.01)
*G01S 5/00* (2006.01)
(Continued)

(52) U.S. Cl.
CPC ............ *G01S 5/0045* (2013.01); *G01S 19/25* (2013.01); *G01S 19/42* (2013.01); *H04W 4/023* (2013.01);
(Continued)

(58) Field of Classification Search
CPC ..... H04W 4/02; H04W 64/00; H04W 64/006; H04W 12/00503; H04W 4/027;
(Continued)

(56) References Cited

U.S. PATENT DOCUMENTS

| | | | |
|---|---|---|---|
| 2006/0036680 A1* | 2/2006 | Shim | ............... H04W 4/02 709/203 |
| 2006/0058042 A1* | 3/2006 | Shim | ............... H04L 12/46 455/456.3 |

(Continued)

FOREIGN PATENT DOCUMENTS

| | | |
|---|---|---|
| CN | 102223601 A | 10/2011 |
| CN | 102742335 A | 10/2012 |

(Continued)

OTHER PUBLICATIONS

XP050927381 3GPP TS 36.305 V12.2.0 (Dec. 2014),3rd Generation Partnership Project;Technical Specification Group Radio Access Network;Evolved Universal Terrestrial Radio Access Network(E-UTRAN);Stage 2 functional specification of User Equipment (UE) positioning in E-UTRAN(Release 12),total 59 pages.

*Primary Examiner* — Quan M Hua
(74) *Attorney, Agent, or Firm* — Womble Bond Dickinson (US) LLP

(57) ABSTRACT

Embodiments of the present disclosure provide a single positioning controller and a positioning control system. The single positioning controller includes: a sending module, configured to send a first positioning measurement request to a first access network node or a first terminal device; a receiving module, configured to receive at least one first positioning measurement result sent by the first access network node or the first terminal device; and a processing module, configured to perform fusion calculation on the at least one first positioning measurement result to obtain location information of the first terminal device.

20 Claims, 7 Drawing Sheets

(51) Int. Cl.
*G01S 19/25* (2010.01)
*G01S 19/42* (2010.01)
*H04W 4/02* (2018.01)
*H04W 4/20* (2018.01)

(52) U.S. Cl.
CPC ............ *H04W 4/20* (2013.01); *H04W 64/00* (2013.01); *H04W 64/006* (2013.01)

(58) Field of Classification Search
CPC ....... H04W 84/12; H04W 88/08; H04W 8/16; H04W 4/20; H04W 4/023; H04W 4/021; H04W 4/029; H04W 60/00; H04W 4/90; H04W 8/10; H04W 8/12; H04W 8/02; H04W 8/08; H04W 24/08; H04W 48/12; H04W 88/02; H04B 17/27; H04L 67/18; H04L 63/107; H04L 67/04; H04M 15/8033; H04M 15/8038; H04M 2207/18; H04M 2250/12; H04M 7/0057
See application file for complete search history.

(56) References Cited

U.S. PATENT DOCUMENTS

| 2006/0246919 A1* | 11/2006 | Park ...................... H04W 8/10 455/456.1 |
| 2009/0303129 A1 | 12/2009 | Sairo et al. |
| 2012/0295623 A1 | 11/2012 | Siomina et al. |
| 2014/0080508 A1 | 3/2014 | Hu et al. |

FOREIGN PATENT DOCUMENTS

| CN | 103052152 A | 4/2013 |
| CN | 103728943 A | 4/2014 |
| CN | 104394590 A | 3/2015 |
| CN | 105142215 A | 12/2015 |
| EP | 2928242 A1 | 10/2015 |
| WO | 2013062451 A1 | 5/2013 |

* cited by examiner

SINGLE POSITIONING CONTROLLER AND POSITIONING CONTROL SYSTEM

CROSS-REFERENCE TO RELATED APPLICATIONS

This application is a continuation of International Application No. PCT/CN2015/098327, filed on Dec. 22, 2015, the disclosure of which is hereby incorporated by reference in its entirety.

TECHNICAL FIELD

Embodiments of the present disclosure relate to the field of wireless communications technologies, and in particular, to a single positioning controller and a positioning control system.

BACKGROUND

A positioning technology is a technology used for determining a geographical location of a terminal. Resources of a wireless communications network may be used to directly or indirectly obtain geographical location information of the terminal.

Terminal positioning manners used in a Long Term Evolution (LTE) system mainly include the following types: network-assisted global navigation satellite system (GNSS) positioning; downlink positioning such as observed time difference of arrival (OTDOA) positioning; enhanced cell identity (e-CID) positioning; and uplink positioning such as uplink time difference of arrival (UTDOA) positioning. For a terminal positioning algorithm used in the LTE system, usually, a feature parameter (a signal field strength, a time difference of arrival of a propagation signal, a direction angle of arrival of a signal, or the like) of a radio wave propagation signal between a terminal and a base station may be detected, and then a geometric location of the mobile terminal may be estimated based on a related positioning algorithm.

With continuous development of mobile communications technologies, demand for terminal positioning services is increasing. Application scenarios of positioning services present a diversification trend, such as emergency assistance positioning, criminal location tracking, navigation, and traffic control. However, regardless of diverse application scenarios, a reliable, effective, and fast positioning method is always required in the industry. In other words, people are always in hot pursuit of a high-accuracy positioning technology that is easy to implement.

Because positioning technologies are diverse, wireless access technologies applied to the positioning technologies are also diverse, for example, positioning in an LTE system, a positioning technology used in a Universal Mobile Telecommunications System (UMTS) system, and a positioning technology of Wireless Fidelity (WiFi). However, one technology fails to fully adapt to complex wireless environments, and cannot implement seamless positioning service coverage. Further, in terms of positioning accuracy improvement, an improvement effect of a single wireless technology has limitations.

In addition, in a current positioning technology, because an enhanced serving mobile location center (E-SMLC) is configured on a core network side, delays of positioning measurement and positioning information interaction are relatively large. This is unacceptable to some delay-sensitive positioning services.

SUMMARY

Embodiments of the present disclosure provide a single positioning controller and a positioning control system, to improve positioning performance.

According to a first aspect, a single positioning controller is provided, including: a sending module, configured to send a positioning signal configuration request to a first access network node, where the positioning signal configuration request includes at least one of the following information: frequency domain location configuration information of a positioning signal, time domain location configuration information of the positioning signal, period configuration information of the positioning signal, power configuration information of the positioning signal, and configuration information of a service signal in a positioning signal subframe;

a receiving module, configured to receive a positioning signal configuration feedback sent by the first access network node, where the sending module is further configured to send, to the first access network node or to a first terminal device by using the first access network node, a first positioning measurement request that is based on at least one wireless positioning method, where the first positioning measurement request includes instruction information for performing positioning measurement on the first terminal device, and the first access network node includes at least one access network node of at least one radio access technology; and the receiving module is further configured to receive at least one first positioning measurement result for the first terminal device that is sent by the first access network node or sent by the first terminal device by using the first access network node, where each first positioning measurement result is corresponding to one wireless positioning method; and a processing module, configured to perform fusion calculation on the at least one first positioning measurement result, to obtain location information of the first terminal device.

The sending module is further configured to send a reference signal configuration status enquiry to the first access network node or to the first terminal device by using the first access network node, where the reference signal configuration status enquiry is used to query a reference signal that has been configured by the first access network node or the first terminal device.

The receiving module is further configured to receive a reference signal configuration status response that is sent by the first access network node or sent by the first terminal device by using the first access network node, where the reference signal configuration status response includes the reference signal that has been configured by the first access network node or the first terminal device.

According to a second aspect, a positioning control system is provided, including: an SPC, an LPD, and a CPD, where the SPC includes:

a sending module, configured to send, to a first access network node or to a first terminal device by using the first access network node, a first positioning measurement request that is based on at least one wireless positioning method, where the first positioning measurement request includes instruction information for performing positioning measurement on the first terminal device, and the first access network node includes at least one access network node of at least one radio access technology;

a receiving module, configured to receive at least one first positioning measurement result for the first terminal device that is sent by the first access network node or sent by the first terminal device by using the first access network node, where each first positioning measurement result is corresponding to one wireless positioning method; and a processing module, configured to perform fusion calculation on the at least one first positioning measurement result, to obtain location information of the first terminal device, where the sending module is further configured to send, to the LPD or the CPD, the location information of the first terminal device that is obtained by the processing module; the LPD is configured to store short-time location information and short-time track information of the first terminal device that are sent by the SPC; and the CPD is configured to store long-time location information and long-time track information of the first terminal device.

Further, the sending module is further configured to send an interference coordination configuration request to the first access network node, where the interference coordination configuration request is used to configure a positioning signal resource using manner for the first access network node; and the receiving module is further configured to receive an interference coordination configuration response sent by the first access network node.

Further, the receiving module is further configured to: before the sending module sends, to the first access network node or to the first terminal device by using the first access network node, the first positioning measurement request that is based on the at least one wireless positioning method, receive a terminal device location information request sent by the first access network node, where the terminal device location information request is used to request the location information of the first terminal device.

Further, the sending module is further configured to send an OTT information and terminal mode information request to the first terminal device by using the first access network node; and the receiving module is further configured to receive an OTT information and terminal mode information feedback that is sent by the first terminal device by using the first access network node.

Further, the sending module is further configured to send a first location information query request to the LPD or the CPD, where the first location information query request includes instruction information for querying the short-time location information and the short-time track information or the long-time location information and the long-time track information of the first terminal device; the LPD is configured to store the short-time location information and the short-time track information of the first terminal device; and the CPD is configured to store the long-time location information and the long-time track information of the first terminal device; and the receiving module is further configured to receive the short-time location information and the short-time track information of the first terminal device that are sent by the LPD or the long-time location information and the long-time track information of the first terminal device that are sent by the CPD, where the short-time location information and the short-time track information or the long-time location information and the long-time track information of the first terminal device are used to assist the processing module in obtaining the location information of the first terminal device.

Further, the sending module is further configured to send, to the LPD or the CPD, the location information of the first terminal device that is obtained by the processing module.

Further, the sending module is further configured to send, to an SRC, location information of a terminal device in an access network node controlled by the SRC.

Further, the sending module is further configured to send a positioning configuration query request to the SRC, where the positioning configuration query request is used to query positioning configuration information of the access network node controlled by the SRC;

the receiving module is further configured to receive the positioning configuration information that is of the access network node controlled by the SRC and that is sent by the SRC;

the processing module is further configured to determine, based on the positioning configuration information of the access network node controlled by the SRC, positioning resource coordination information of the access network node controlled by the SRC, where the positioning resource coordination information is used to coordinate a positioning resource of the access network node controlled by the SRC;

the sending module is further configured to send the positioning resource coordination information to the SRC; and the receiving module is further configured to receive a positioning resource coordination response sent by the SRC.

Further, the receiving module is further configured to receive a second location information query request sent by an MDT entity, where the second location information query request includes location information for querying the first terminal device and time stamp information bound with the location information of the first terminal device; and the sending module is further configured to send, to the MDT entity, the location information of the first terminal device and the time stamp information bound with the location information of the first terminal device.

Further, the LPD is further configured to send the short-time location information and the short-time track information of the first terminal device to the CPD; and the CPD is further configured to update the long-time location information and the long-time track information of the first terminal device based on the short-time location information and the short-time track information of the first terminal device.

Further, the CPD is further configured to send a short-time location information and short-time track information query request to the LPD.

Further, the LPD is further configured to send a long-time location information and long-time track information query request to the CPD;

the CPD is further configured to send the long-time location information and the long-time track information of the first terminal device to the LPD; and the LPD is further configured to update the short-time location information and the short-time track information of the first terminal device based on the long-time location information and the long-time track information of the first terminal device.

Further, the LPD is further configured to receive a second location information query request sent by an MDT entity, where the second location information query request includes location information and track information for querying the first terminal device and time stamp information bound with the location information of the first terminal device; and send, to the MDT entity, the location information and the track information of the first terminal device and the time stamp information bound with the location information of the first terminal device.

According to the single positioning controller and the positioning control system provided in the embodiments of the present disclosure, the first positioning measurement request that is based on the at least one wireless positioning method is sent to the first access network node or to the first terminal device by using the first access network node, the at least one first positioning measurement result for the first terminal device that is sent by the first access network node or sent by the first terminal device by using the first access network node is received, and then fusion calculation is performed on the at least one first positioning measurement result, to obtain the location information of the first terminal device. Because the location information of the first terminal device is obtained by performing fusion calculation on the at least one first positioning measurement result that is based on the at least one wireless positioning method, during obtaining the location information of the first terminal device, advantages of all positioning methods are used, so that more accurate location information of the first terminal device is obtained, and a delay of positioning processing is reduced.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

A plurality of mobile network standards, such as Global System for Mobile Communications (GSM), UMTS, and LTE, coexist in an evolution process of an LTE system. Mobile networks of various standards have relatively independent network architectures such as independent access networks, for example, a Global System for Mobile Communications/Enhanced Data rates for GSM Evolution radio access network (GERAN), a UMTS radio access network (UTRAN), and an evolved UMTS radio access network (E-UTRAN).

When a network is evolved into the LTE system, network resources of various standards are integrated together. Therefore, some network functions are shared on a core network side by networks of various standards. For example, a positioning function is shared by the networks, and for all the networks of various standards, positioning on a terminal needs to be implemented by using a gateway mobile location center (GGMLC) disposed on the core network side. However, specific positioning methods used for the networks of various standards are different.

Figure 1:
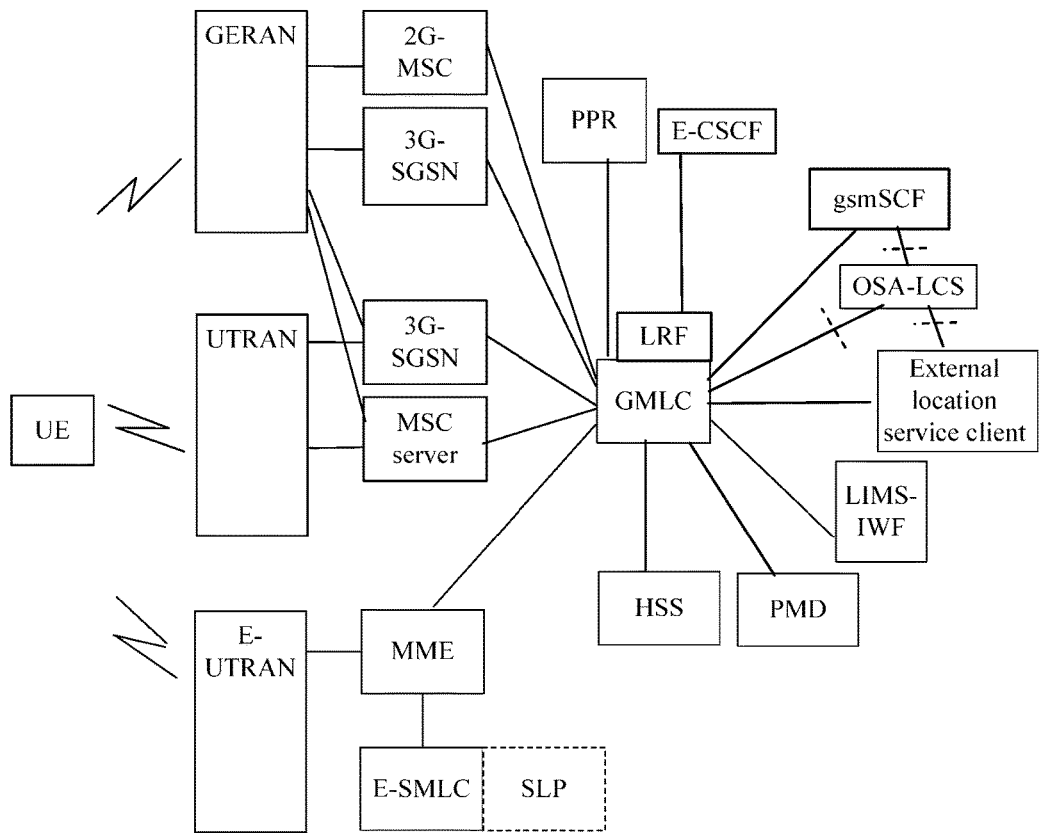
FIG. 1 is a schematic diagram of a positioning architecture of a mobile network.

FIG. 1 is a schematic diagram of a positioning architecture of a mobile network. In FIG. 1, user equipment (UE) is located in coverage areas of three access networks: a GERAN, a UTRAN, and an E-UTRAN at the same time. In each access network, positioning on the UE is implemented through interaction between a respective network element and a GMLC.

A connection relationship of network elements is shown in the figure. The GERAN and the UTRAN each have a corresponding mobile switching center (MSC) and serving GPRS support node (SGSN), where the GERAN is corresponding to a 2nd generation (2G)-MSC and a 2G-SGSN, and the UTRAN is corresponding to a 3rd generation (3G)-MSC and a 3G-SGSN. In the GERAN and the UTRAN, positioning on the UE is implemented through interaction between the GMLC and the MSCs and SGSNs corresponding to the GERAN and the UTRAN. In the E-UTRAN, interaction is performed between a mobility management entity (MME) and the GMLC.

To implement positioning on a terminal, the GMLC further needs to interact with network elements such as a location retrieval function entity (LRF), an emergency-call session control function (E-CSCF), a private profile register (PPR), a home subscriber server (HSS), a physical medium dependent (PMD) layer interface, a location IMS-interworking function (LIMS-IWF), an open service access-location service (OSA-LCS), a GSM service control function (GSM SCF), and an external location service client (External LCS client).

However, different positioning technologies are used for the access networks during positioning on the terminal, and each access network has independent positioning network elements. The LTE system is used as an example. An enhanced serving mobile location centre (E-SMLC) connected to the MME implements, by using a Service Location Protocol (SLP) entity, positioning on a terminal that accesses the E-UTRAN.

In the figure, network elements except the GERAN, the UTRAN, and the E-UTRAN are all on a core network side. Therefore, it can be seen from the figure that, network elements required for implementing wireless positioning are all on the core network side. The GMLC not only processes various positioning requests, and invokes a capability of a wireless network based on accuracy required by a request, to obtain positioning information, but also implements operation of positioning services, including functions of user data management, service data management, subscription information management, authorization, authentication and accounting of a value-added application, and the like.

Based on the positioning architecture of the mobile network shown in FIG. 1, a positioning process in the LTE system is as follows: (1) The GMLC receives a positioning request; (2) the GMLC finds an MME serving a terminal currently; (3) the GMLC sends, to the MME, a request for positioning the target terminal; (4) the MME sends the positioning request to the E-SMLC; (5) the E-SMLC performs capability interaction with the terminal and performs measurement configuration; the E-SMLC also interacts with a base station accessed by the terminal, to obtain positioning signal configuration information of a base station side; (6) the E-SMLC obtains a positioning measurement result reported by the terminal (and the base station), and performs positioning calculation, to obtain a terminal location; (7) the E-SMLC reports the terminal location back to the MME; (8) the MME feeds back the terminal location to the GMLC; and (9) the GMLC feeds back the terminal location to a source end of the positioning request.

In the foregoing wireless positioning process, a large quantity of interaction on the core network side is performed, such as interaction between the GMLC and the MME, and a large delay is brought due to interaction on the core network side. Because the E-SMLC does not have a capability of configuring sending of a positioning reference signal, there is a large amount of interaction in the positioning process, and a large amount of signaling is used. In addition, in the foregoing process, only interaction of a single LTE system is considered, and a positioning manner in which a terminal in the LTE system performs inter-system measurement and performs report is not considered. This results in a complex system architecture and limited positioning accuracy.

In view of this, an embodiment of the present disclosure provides a single positioning controller (SPC). The single positioning controller is configured to implement wireless network positioning. In addition, the single positioning controller is compatible with various access network standards, and comprehensively utilizes various wireless positioning technologies.

Figure 2:
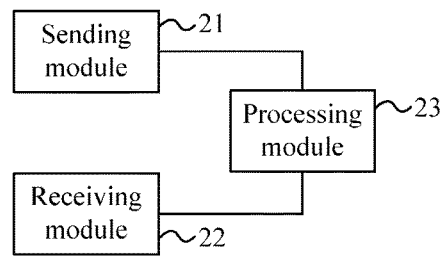
FIG. 2 is a schematic structural diagram of a single positioning controller according to an embodiment of the present disclosure.

FIG. 2 is a schematic structural diagram of a single positioning controller according to an embodiment of the present disclosure. As shown in FIG. 2, the single positioning controller includes a sending module 21, a receiving module 22, and a processing module 23.

The sending module 21 is configured to send, to a first access network node or to a first terminal device by using the first access network node, a first positioning measurement request that is based on at least one wireless positioning method, where the first positioning measurement request includes instruction information for performing positioning measurement on the first terminal device, and the first access network node includes at least one access network node of at least one radio access technology.

Specifically, the single positioning controller provided in this embodiment may be deployed in any location on a network, for example, a core network side or an access network side. Alternatively, the single positioning controller provided in this embodiment may also be a function that is integrated into any network element device on the network. However, it is worth noting that, if the single positioning controller provided in this embodiment is deployed on the core network side or is integrated into any network element device on the access network side, during implementation of positioning processing by the single positioning controller provided in this embodiment, main interaction is implemented on the access network side, so that a delay of positioning processing is reduced.

The single positioning controller provided in this embodiment includes the sending module 21. The sending module 21 may be a transmitter that is individually disposed, or may be any module or apparatus having a sending function. When the single positioning controller receives a positioning request related to the first terminal device, or when the single positioning controller proactively initiates positioning on the first terminal device, the sending module 21 sends the first positioning measurement request to the first terminal device by using the first access network node, or the sending module 21 sends the first positioning measurement request to the first access network node. The first access network node is an access network node accessed by the first terminal device, the first positioning measurement request includes the instruction information for performing positioning measurement on the first terminal device, and the sending module 21 sends the first positioning measurement request that is based on the at least one wireless positioning method.

Positioning methods applied to different types of access networks are different. Therefore, during sending the first positioning measurement request to the first access network node, the sending module 21 needs to send, to the first access network node based on a network type of the first access network node, a first positioning measurement request for which a positioning method corresponding to the network type of the first access network node is applied. For the first terminal device, the sending module 21 may also send, to the first terminal device based on an access network type of a network accessed by the first terminal device, a first positioning measurement request for which a positioning method corresponding to the type of the network accessed by the first terminal device is applied. In short, each first positioning measurement request that is sent by the sending module 21 to the first access network node or the first terminal device needs to be able to be used for independently implementing positioning measurement on the first terminal device.

It should be noted that, the first access network node may be any access network node having a terminal access capability, for example, a base station, a micro base station, and a remote radio unit on networks of various standards, or an access point (AP) in WiFi.

The receiving module 22 is configured to receive at least one first positioning measurement result for the first terminal device that is sent by the first access network node or sent by the first terminal device by using the first access network node, where each first positioning measurement result is corresponding to one wireless positioning method.

Specifically, after the first access network node or the first terminal device receives the first positioning measurement request, the receiving module 22 of the single positioning controller receives a measurement result that is corresponding to the first positioning measurement request and that is sent by the first access network node or the first terminal device. The measurement result may be location information of the first terminal device that is directly obtained through measurement by the first access network node or the first terminal device according to the first positioning measurement request. Alternatively, the measurement result may be information that is required by the single positioning controller to perform positioning measurement and that is fed back by the first access network node or the first terminal device after the first access network node or the first terminal device receives the first positioning measurement request.

Because the sending module 21 sends, to the first access network node or the first terminal device, the first positioning measurement request that is based on the at least one wireless positioning method, the receiving module 22 also receives the first positioning measurement result that is based on the at least one wireless positioning method.

The processing module 23 is configured to perform fusion calculation on the at least one first positioning measurement result, to obtain location information of the first terminal device.

Specifically, after the receiving module 22 receives first positioning measurement results sent by the first access network node or the first terminal device, the processing module 23 may determine a piece of location information of the first terminal device based on each first positioning measurement result. After obtaining a plurality of pieces of location information of the first terminal device, the processing module 23 may perform fusion calculation on the plurality of pieces of location information, to obtain final location information of the first terminal device. Any multi-data fusion calculation method may be used to perform fusion calculation on the plurality of pieces of location information of the first terminal device. For example, arithmetic mean calculation may be performed on longitude and latitude coordinates of the plurality of pieces of location information, to obtain longitude and latitude coordinates of the final location information. Alternatively, after an arithmetic center of all pieces of location information is determined, a corresponding weight is assigned to each piece of location information based on a distance between each piece of location information and the arithmetic center, and then weighted averaging is performed on products of all location information and the corresponding weights.

The location information of the first terminal device that is finally obtained by the processing module 23 is obtained by performing fusion calculation on the at least one first positioning measurement result, and first positioning measurement results are obtained through measurement by using different wireless positioning methods. Therefore, during obtaining the location information of the first terminal device obtained by the single positioning controller provided in this embodiment, advantages of all positioning methods are used, so that more accurate location information of the first terminal device is obtained. In addition, when wireless networks of some standards are faulty, positioning on the terminal can still be implemented.

In addition, to independently implement positioning processing, the single positioning controller provided in this embodiment of the present disclosure further needs to perform positioning signal configuration. Therefore, the sending module 21 is further configured to send a positioning signal configuration request to the first access network node, where the positioning signal configuration request includes at least one or more of the following information: frequency domain location configuration information of a positioning signal, time domain location configuration information of the positioning signal, period configuration information of the positioning signal, power configuration information of the positioning signal, and configuration information of a service signal in a positioning signal subframe. The receiving module 22 is further configured to receive a positioning signal configuration feedback sent by the first access network node.

Specifically, to obtain the location information of the first terminal device, the single positioning controller provided in this embodiment of the present disclosure needs to send the first positioning measurement request to the first access network node or to the first terminal device by using the first access network node, and receive the first positioning measurement result. Both the first positioning measurement request and the first positioning measurement result are newly defined information. To ensure timely and accurate positioning, corresponding communication resources need to be configured for the first positioning measurement request and the first positioning measurement result. Therefore, before the sending module 21 in the single positioning controller sends the first positioning measurement request, the sending module 21 further needs to notify the first access network node of resource configuration information that is required for sending the first positioning measurement request and the first positioning measurement result. After receiving the resource configuration information, the first access network node may receive the first positioning measurement request or send the first positioning measurement result on a corresponding resource. The first positioning measurement request and the first positioning measurement result are collectively referred to as a positioning signal, and the positioning signal configuration request includes at least one or more of the following information: frequency domain location configuration information of the positioning signal (for indicating specific frequency domain resources to which the positioning signal is mapped), time domain location configuration information of the positioning signal (for indicating specific time domain resources to which the positioning signal is mapped), period configuration information of the positioning signal, power configuration information of the positioning signal, and configuration information of a service signal in a positioning signal subframe (for indicating time-frequency domain resource occupation of a common service signal in a positioning signal subframe). After the first access network node receives the positioning signal configuration request, the receiving module 22 further receives the positioning signal configuration feedback sent by the first access network node. In this case, the single positioning controller may determine that the first access network node has learned of positioning signal configuration information.

According to the single positioning controller provided in this embodiment, the first positioning measurement request that is based on the at least one wireless positioning method is sent to the first access network node or to the first terminal device by using the first access network node, the at least one first positioning measurement result for the first terminal device that is sent by the first access network node or sent by the first terminal device by using the first access network node is received, and then fusion calculation is performed on the at least one first positioning measurement result, to obtain the location information of the first terminal device. Because the location information of the first terminal device is obtained by performing fusion calculation on the at least one first positioning measurement result that is based on the at least one wireless positioning method, during obtaining the location information of the first terminal device, advantages of all positioning methods are used, so that more accurate location information of the first terminal device is obtained, and a delay of positioning processing is reduced.

The single positioning controller provided in the embodiment shown in FIG. 2 comprehensively utilizes wireless positioning methods of a plurality of wireless communications standards in a current network architecture in which a plurality of access networks coexist, thereby improving wireless positioning accuracy. Based on the single positioning controller shown in FIG. 2, another function may further be configured for the single positioning controller, so that wireless positioning performance is further improved based on comprehensive utilization of the wireless positioning methods of the plurality of wireless communications standards.

Based on the embodiment shown in FIG. 2, the sending module 21 is further configured to send a reference signal configuration status enquiry to the first access network node or to the first terminal device by using the first access network node, where the reference signal configuration status enquiry is used to query a reference signal that has been configured by the first access network node or the first terminal device; and the receiving module 22 is further configured to receive a reference signal configuration status response that is sent by the first access network node or by the first terminal device by using the first access network node, where the reference signal configuration status response includes the reference signal that has been configured by the first access network node or the first terminal device.

Specifically, in a process in which the single positioning controller performs wireless positioning, a reference signal that is sent by the first terminal device or by the first access network node accessed by the first terminal device may be further required to assist positioning. In addition, the first positioning measurement request and the first positioning measurement result are also reference signals. In this case, before sending the first positioning measurement request the single positioning controller needs to first learn of the reference signal that has been configured by the first access network node or the first terminal device. Therefore, the sending module 21 may further send the reference signal configuration status enquiry to the first access network node or to the first terminal device by using the first access network node. After receiving the enquiry, the first access network node or the first terminal device may feed back the configured reference signal to the single positioning controller. The receiving module 22 receives the reference signal configuration status response that is sent by the first access network node or by the first terminal device by using the first access network node.

Based on the embodiment shown in FIG. 2, the sending module 21 is further configured to send an interference coordination configuration request to the first access network node, where the interference coordination configuration request is used to configure a positioning signal resource using manner for the first access network node; and the receiving module 22 is further configured to receive an interference coordination configuration response sent by the first access network node.

Specifically, in addition to the reference signal such as the positioning signal, the first access network node and the first terminal device further need to receive and send a normal service signal. Therefore, when positioning is performed on the first terminal device, in order not to interfere with the normal service signal of the first terminal device or the first access network node, before sending the first positioning measurement request, the sending module 21 further sends the interference coordination configuration request to the first access network node, where the interference coordination configuration request is used to configure a signal resource using manner of each access network node that participates in positioning, for example, when the first access network node sends a positioning reference signal, configure that the first access network node does not send a service signal. Certainly, after the first access network node receives the interference coordination configuration request, the receiving module 22 receives the interference coordination configuration response sent by the first access network node.

Based on the embodiment shown in FIG. 2, the receiving module 22 is further configured to: before the sending module 21 sends, to the first access network node or to the first terminal device by using the first access network node, the first positioning measurement request that is based on the at least one wireless positioning method, receive a terminal device location information request sent by the first access network node, where the terminal device location information request is used to request the location information of the first terminal device.

In other words, the first positioning measurement request sent to the first terminal device may be sent according to the request of the first access network node, and a device that needs to obtain the location information of the first terminal device is the first access network node. Certainly, any other network element on the network may need to obtain the location information of the first terminal device, and the single positioning controller may send the first positioning measurement request according to any message for requesting the location information of the first terminal device.

Based on the embodiment shown in FIG. 2, the sending module 21 is further configured to send an over the top (OTT) information and terminal mode information request to the first terminal device by using the first access network node; and the receiving module 22 is further configured to receive an OTT information and terminal mode information feedback that is sent by the first terminal device by using the first access network node.

Specifically, OTT information is various application services provided for a user through the Internet. Generally, the OTT information is information, such as a shot image, in a terminal application (APP). Terminal mode information is specified mode information, such as a high-speed rail mode, of a terminal human-machine interface. Because in a positioning process, different modes of a terminal affect a positioning result, the single positioning controller may obtain terminal mode information of the terminal. Because many current terminal devices each have an independent positioning module such as a GPS, the single positioning controller may further obtain another piece of location information of the terminal by using the OTT information. The foregoing location information of the terminal device obtained by using the OTT information may be used to perform fusion calculation together with another piece of location information of the terminal, thereby further improving positioning accuracy for the terminal device.

During positioning performed on the terminal by using the single positioning controller shown in FIG. 2, a large amount of process data needs to be stored. To reduce a positioning delay and decrease data traffic required for positioning, a corresponding database may be further configured in a system to store positioning data. Concepts of a local positioning database (LPD) and a cloud positioning database (CPD) are proposed in an embodiment of the present disclosure. The SPC, the LPD, and the CPD together form a positioning control system.

Figure 3:
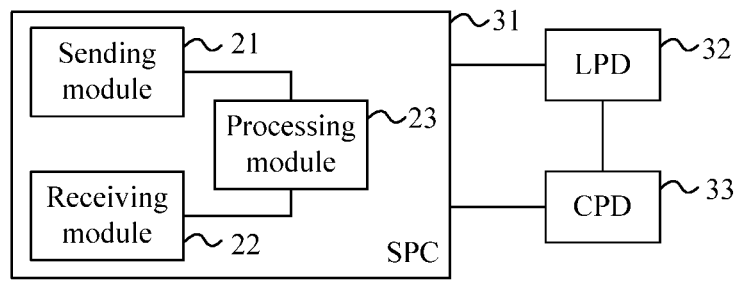
FIG. 3 is a schematic structural diagram of a positioning control system according to an embodiment of the present disclosure.

FIG. 3 is a schematic structural diagram of a positioning control system according to an embodiment of the present disclosure. As shown in FIG. 3, the positioning control system provided in this embodiment includes an SPC 31, an LPD 32, and a CPD 33. The SPC 31 may be the SPC in the embodiment shown in FIG. 2, and the SPC 31 includes at least a sending module 21, a receiving module 22, and a processing module 23.

The LPD 32 is disposed on an access network side, and is configured to store short-time location information and short-time track information of a terminal device. The CPD 33 is disposed on a core network side, and is configured to store long-time location information and long-time track information of the terminal device. To shorten a time required for positioning on the terminal device and improve positioning accuracy, location information of the terminal device may be stored in the LPD 32 each time after the SPC 31 performs positioning on the terminal device, or the SPC 31 may periodically collect location information of the terminal device on a network, and store the collected location information in the LPD 32. Location information of a terminal device at all time points forms track information of the terminal device. After a preset period of time, or after collecting a specific quantity of pieces of location information, the LPD 32 sends the location information of the terminal device to the CPD 33, and the CPD 33 stores the received location information of the terminal device. The LPD 32 is merely configured to store location information and track information that is of the terminal device and that is obtained in a latest period, and the location information and the track information that is of the terminal device and that is obtained in a latest period are referred to as the short-time location information and the short-time track information of the terminal device. The CPD 33 is configured to store all location information and track information of the terminal device, and all the location information and track information of the terminal device are referred to as the long-time location information and the long-time track information of the terminal device. The LPD 32 may be used for positioning calculation of the SPC 31, and amend a positioning result based on a moving track, a geographic information system (Geographic Information System or Geo-Information System, GIS) and rate information. After obtaining the positioning result, the SPC 31 may also output the positioning result to maintain the LPD 32. The CPD 33 may be configured to collect statistics about user behavior and habits and service hotspots and perform big data analysis. In addition, the CPD 33 is used as an external outlet of positioning information obtained by the SPC 31.

The sending module 21 is configured to send a first location information query request to the LPD 32 or the CPD 33, where the first location information query request includes instruction information for querying short-time location information and short-time track information or long-time location information and long-time track information of a first terminal device. The receiving module 22 is configured to receive the short-time location information and the short-time track information of the first terminal device that are sent by the LPD 32 or the long-time location information and the long-time track information of the first terminal device that are sent by the CPD 33, where the short-time location information and the short-time track information or the long-time location information and the long-time track information of the first terminal device are used to assist the processing module in obtaining location information of the first terminal device.

When the SPC 31 needs to obtain the location information or track information of the first terminal device from the LPD 32 or the CPD 33, the sending module 21 may send the first location information query request to the LPD 32 or the CPD 33. The receiving module 22 of the SPC 31 receives the short-time location information and the short-time track information of the first terminal device that are sent by the LPD 32 or the long-time location information and the long-time track information of the first terminal device that are sent by the CPD 33. The processing module 23 of the SPC 31 may calculate the location information of the first terminal device with the assistance of the short-time location information and the short-time track information or the long-time location information and the long-time track information of the first terminal device. Because a moving track of the first terminal device may not be jumping, the foregoing manner may be used to avoid a jumping positioning fault during terminal positioning due to a fault occurring on network elements. For example, the first terminal device is at a point A at a time point a, and a network element requests, at a time point b, to obtain location information of the first terminal device. Because a network element on the network is faulty, a location that is of the first terminal device and that is obtained by the SPC 31 is a point C. However, a distance between the point A and the point C obviously exceeds a possible maximum moving distance, from the time point a to the time point b, of the first terminal device. In this case, the SPC 31 may learn, based on information that the first terminal device is at the point A at the time point a, that an error exists during current positioning, where the information is obtained from the LPD 32 or the CPD 33.

To maintain the LPD 32 and the CPD 33, the sending module 21 is further configured to send, to the LPD 32 or the CPD 33, the location information of the first terminal device that is obtained by the processing module 23.

Each access network further has a respective single access network controller (SRC), and the SRC is configured to manage and maintain a network element device on the access network and a terminal device accessing the access network. Therefore, after the SPC 31 obtains the location information of the terminal device, the sending module 21 is further configured to send, to the SRC, location information of a terminal device on an access network node controlled by the SRC.

During positioning on the terminal device by the SPC 31, in some positioning methods, a plurality of network element devices (for example, a plurality of base stations) need to be used to perform measurement on one terminal device, to obtain a positioning result for one terminal device on one access network. In the access network, network element devices are all managed and maintained by the SRC. Therefore, the sending module 21 of the SPC 31 is further configured to send a positioning configuration query request to the SRC, where the positioning configuration query request is used to query positioning configuration information of the access network node controlled by the SRC; the receiving module 22 is further configured to receive the positioning configuration information that is of the access network node controlled by the SRC and that is sent by the SRC; and the processing module 23 is further configured to determine, based on the positioning configuration information of the access network node controlled by the SRC, positioning resource coordination information of the access network node controlled by the SRC, where the positioning resource coordination information is used to coordinate a positioning resource of the access network node controlled by the SRC; the sending module 21 is further configured to send the positioning resource coordination information to the SRC; and the receiving module 22 is further configured to receive a positioning resource coordination response sent by the SRC. In this way, the SPC 31 may coordinate positioning resources of all access network nodes, to implement positioning on a terminal device on the access network without using the SRC to coordinate resources on the access network.

On a wireless communications network, to test performance of the network, various parameters of the network need to be tested in a drive test manner. A drive test is a test method for measuring the network on site, and during the drive test, parameters of the network need to be continuously tested on a specific line. Minimization of drive tests (MDT) is a common drive test method. During the MDT, an MDT entity is used for measurement. During MDT measurement, after measurement is performed on each test point, network performance can be obtained through overall analysis only after location information and time information of each test point is further obtained.

Therefore, the receiving module 22 of the SPC 31 is further configured to receive a second location information query request sent by the MDT entity, where the second location information query request includes location information for querying the first terminal device and time stamp information bound with the location information of the first terminal device; and the sending module 21 is further configured to send, to the MDT entity, the location information of the first terminal device and the time stamp information bound with the location information of the first terminal device.

In the embodiment shown in FIG. 3, the LPD 32 is further configured to send the short-time location information and the short-time track information of the first terminal device to the CPD 33; and the CPD 33 is further configured to update the long-time location information and the long-time track information of the first terminal device based on the short-time location information and the short-time track information of the first terminal device. In other words, the LPD 32 may send the stored short-time location information and short-time track information of the first terminal device to the CPD 33, and this sending process may be a periodic process; or the short-time location information and the short-time track information of the first terminal device may be sent when the LPD 32 detects that a data volume reaches a specific threshold. The long-time location information and the long-time track information of the first terminal device of the CPD 33 are updated based on the short-time location information and the short-time track information of the first terminal device that are sent by the LPD 32.

In addition, the CPD 33 may further proactively request the LPD 32 to send the short-time location information and the short-time track information of the first terminal device.

In this case, the CPD 33 is further configured to send a short-time location information and short-time track information query request to the LPD 32. After receiving short-time location information and short-time track information query request, the LPD 32 sends the short-time location information and the short-time track information of the first terminal device to the CPD 33.

The LPD 32 is further configured to send a long-time location information and long-time track information query request to the CPD 33; the CPD 33 is further configured to send the long-time location information and the long-time track information of the first terminal device to the LPD 32; and the LPD 32 is further configured to update the short-time location information and the short-time track information of the first terminal device based on the long-time location information and the long-time track information of the first terminal device.

Because the LPD 32 stores only location information and track information that is of the first terminal device and that is obtained in a specific period of time, if a location update process of the first terminal device is not performed in a quite long period of time, the LPD 32 needs to obtain the long-time location information and the long-time track information of the first terminal device from the CPD 33 to update the short-time location information and the short-time track information of the first terminal device.

In an MDT process, the MDT entity obtains the location information of the terminal device from the SPC 31 each time, and triggers the SPC 31 to perform location measurement each time. However, in the MDT process, the location information of the terminal device is obtained quite frequently in a short period. This wastes many transmission resources. Because the LPD 32 stores the short-time location information and the short-time track information of the terminal device, the MDT entity may send a second location information query request to the LPD 32, where the second location information query request includes location information and track information for querying the first terminal device and time stamp information bound with the location information of the first terminal device. The LPD 32 sends, to the MDT entity, the location information and the track information of the first terminal device and the time stamp information bound with the location information of the first terminal device, so that the MDT entity can implement the MDT process.

In the following, interaction flowcharts are used to further describe interaction processes, in the positioning process, of the SPC and the positioning control system provided in the foregoing embodiments.

Figure 4:
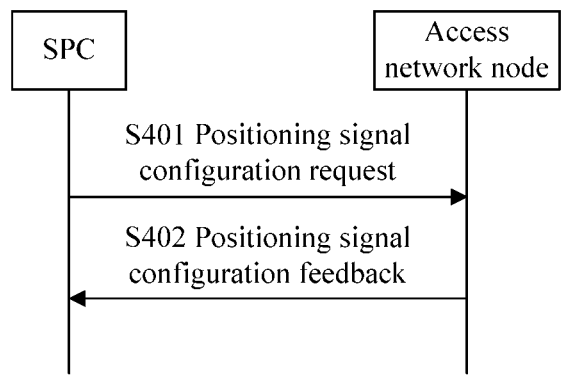
FIG. 4 is a flowchart of positioning signal configuration interaction between an SPC and an access network node.

FIG. 4 is a flowchart of positioning signal configuration interaction between an SPC and an access network node. As shown in FIG. 4, in step S401, the SPC sends a positioning signal configuration request to the access network node. The positioning signal configuration request may include one or more of the following content: frequency domain location configuration of a positioning signal (for indicating specific frequency domain resources to which the positioning signal is mapped); time domain location configuration of the positioning signal (for indicating specific time domain resources to which the positioning signal is mapped); period configuration of the positioning signal; power configuration of the positioning signal; and configuration of a service signal in a positioning signal subframe (for indicating time-frequency domain resource occupation of a common service signal in a positioning signal subframe). In step S402, the access network node feeds back one piece of acknowledgment information to the SPC in response to the positioning signal configuration request.

Figure 5:
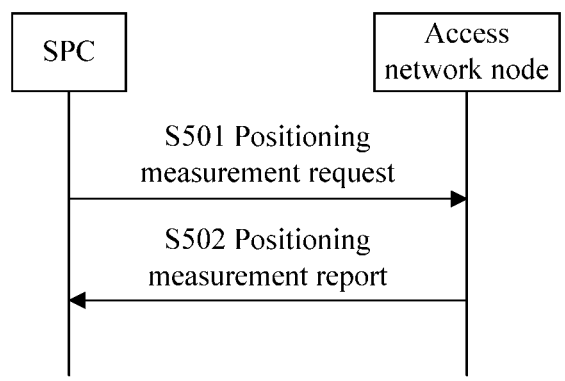
FIG. 5 is a flowchart of positioning measurement message interaction between an SPC and an access network node.

FIG. 5 is a flowchart of positioning measurement message interaction between an SPC and an access network node. As shown in FIG. 5, in step S501, the SPC sends a positioning measurement request to the access network node, for requesting the access network node to perform measurement on a network side, for example, performing angle of arrival (AoA) measurement or Rx-Tx time difference (Rx-Tx) measurement. In step S502, the access network node sends a positioning measurement result to the SPC.

Figure 6:
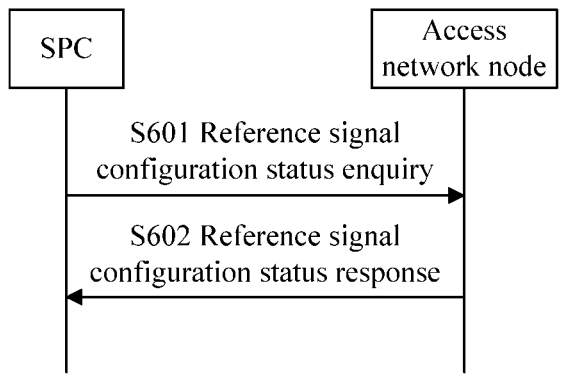
FIG. 6 is a flowchart of reference signal configuration information interaction between an SPC and an access network node.

FIG. 6 is a flowchart of reference signal configuration information interaction between an SPC and an access network node. As shown in FIG. 6, in step S601, the SPC sends a reference signal configuration status enquiry to the access network node, for enquiring a reference signal (such as a channel state information-reference signal (Channel-State Information reference signal, CSI-RS)) that has been currently configured by the access network node. In step S602, the access network node sends a reference signal configuration status to the SPC.

Figure 7:
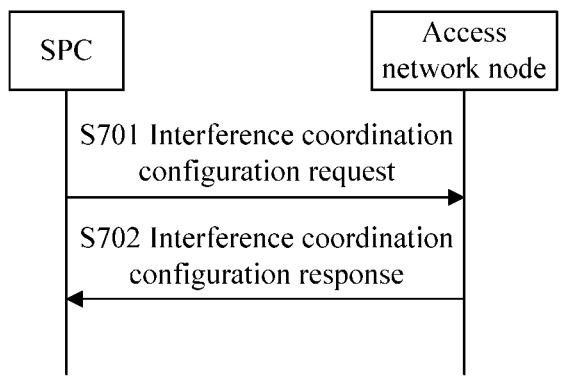
FIG. 7 is a flowchart of interference coordination interaction between an SPC and an access network node.

FIG. 7 is a flowchart of interference coordination interaction between an SPC and an access network node. As shown in FIG. 7, in step S701, the SPC sends an interference coordination configuration request to the access network node. The interference coordination configuration request is used to configure a signal resource using manner of each access network node that participates in positioning, for example, when an access network node sends a positioning reference signal, configure that the access network node does not send a service signal. In step S702, the access network node sends an interference coordination configuration response to the SPC.

Figure 8:
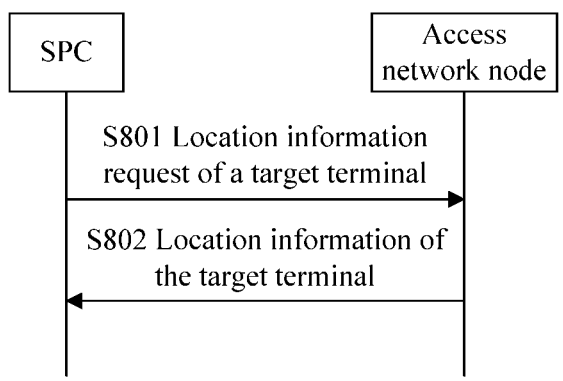
FIG. 8 is a flowchart of terminal location information obtaining interaction between an SPC and an access network node.

FIG. 8 is a flowchart of terminal location information obtaining interaction between an SPC and an access network node. As shown in FIG. 8, in step S801, the SPC sends, to the access network node, a location information request for a target terminal. In step S802, the access network node sends location information of the target terminal to the SPC.

Figure 9:
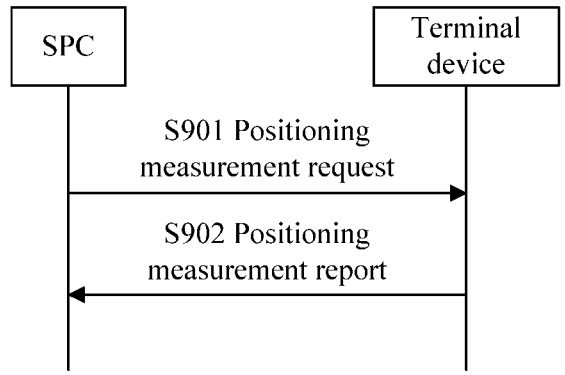
FIG. 9 is a flowchart of measurement interaction between an SPC and a terminal device.

FIG. 9 is a flowchart of measurement interaction between an SPC and a terminal device. As shown in FIG. 9, in step S901, the SPC sends a positioning measurement request to the terminal, for requesting the terminal to perform positioning measurement, such as time of arrival (ToA) measurement, or Rx-Tx measurement on a terminal side, or reference signal time difference (RSTD) measurement. In step S902, the terminal device sends a positioning measurement report to the SPC.

Figure 10:
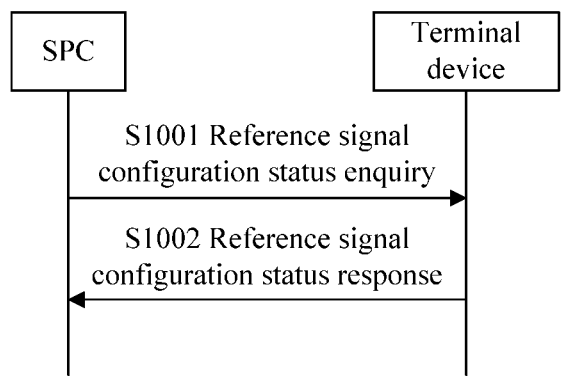
FIG. 10 is a flowchart of reference signal configuration information interaction between an SPC and a terminal device.

FIG. 10 is a flowchart of reference signal configuration information interaction between an SPC and a terminal device. As shown in FIG. 10, in step S1001, the SPC sends a reference signal configuration status enquiry to the terminal, for enquiring current uplink reference signal configuration information (such as configuration information of a sounding reference signal (Sounding Reference Signal, SRS)) of the terminal. In step S1002, the access network node sends a reference signal configuration status response to the SPC.

Figure 11:
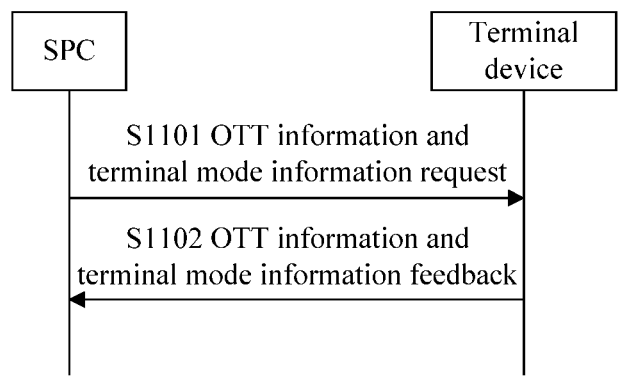
FIG. 11 is a flowchart of OTT information and terminal mode information interaction between an SPC and a terminal device.

FIG. 11 is a flowchart of OTT information and terminal mode information interaction between an SPC and a terminal device. As shown in FIG. 11, in step S1101, the SPC sends an OTT information and terminal mode information request to the terminal. OTT information is information, such as a shot image, in a terminal APP. Terminal mode information is specified mode information, such as a high-speed rail mode, of a terminal human-machine interface. In step S1102, the terminal device sends an OTT information and terminal mode information feedback to the SPC.

Figure 12:
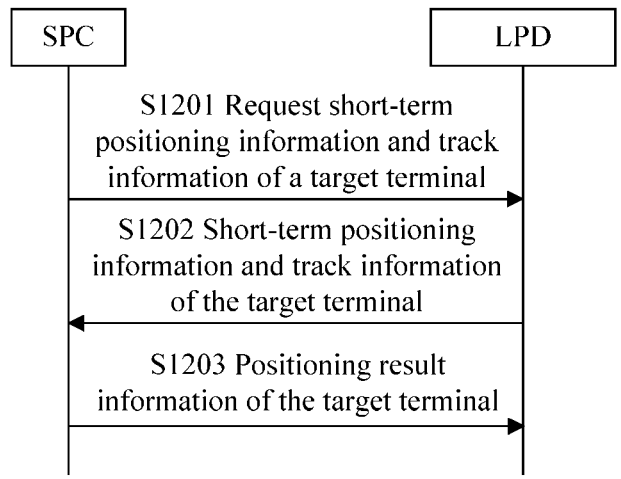
FIG. 12 is a flowchart of short-time positioning information and track information interaction between an SPC and an LPD.

FIG. 12 is a flowchart of short-time positioning information and track information interaction between an SPC and an LPD. As shown in FIG. 12, in step S1201, the SPC requests the LPD to notify the SPC of short-time positioning information and track information of a target terminal. The short-time positioning information herein and track information is location information of the terminal in a past period of time (may be location information in several minutes or several hours), and moving track information of the terminal. In step S1202, the LPD sends the short-time positioning information and track information of the target terminal to the SPC. In step S1203, the SPC calculates a terminal location, and outputs final positioning result information of the target terminal to the LPD, for maintaining a terminal location database of the LPD. Signals sent by the SPC to the LPD include but are not limited to one or more of the following information: a two-dimensional or three-dimensional positioning result of a terminal device; an update time of a positioning result, which can be regarded as a time stamp; a speed of the terminal device; and a positioning accuracy identifier.

In addition, the LPD may send terminal device location information to the SPC in a periodic or event triggering manner, where the terminal location information includes one or more of the following information: track information of the terminal device, where the information may be used by the SPC to calibrate positioning information; and local GIS information, where the information may assist the SPC in positioning, for example, the information is that the terminal device is on a highway or on a high-speed train.

In addition, the CPD may also send terminal device location information to the SPC in a periodic or event triggering manner, where the terminal location information includes one or more of the following information: track information of the terminal device, where the information may be used by the SPC to calibrate positioning information; and local GIS information, where the information may assist the SPC in positioning, for example, the information is that the terminal device is on a highway or on a high-speed train.

Figure 13:
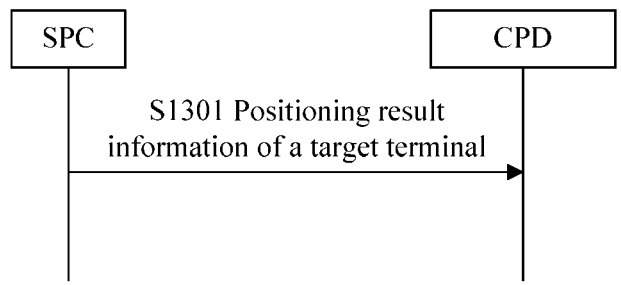
FIG. 13 is a flowchart of terminal positioning result interaction between an SPC and a CPD.

FIG. 13 is a flowchart of terminal positioning result interaction between an SPC and a CPD. As shown in FIG. 13, in step S1301, the SPC calculates a terminal location, and outputs final positioning result information of a target terminal to the CPD, for maintaining a terminal location database of the CPD.

Figure 14:
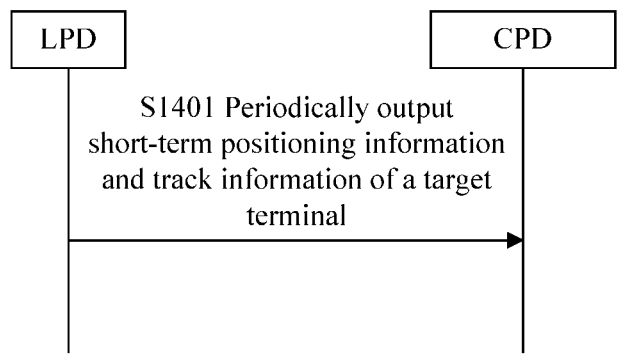
FIG. 14 and FIG. 15 are flowcharts of short-time positioning information and track information interaction between an LPD and a CPD.
Figure 15:
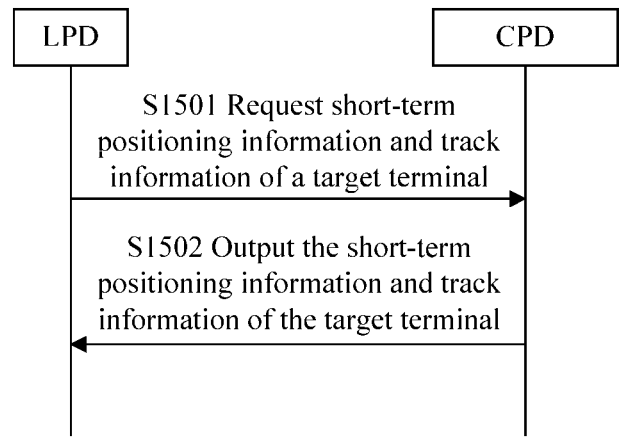

FIG. 14 and FIG. 15 are flowcharts of short-time positioning information and track information interaction between an LPD and a CPD. As shown in FIG. 14, in step S1401, the LPD periodically outputs, to the CPD, short-time positioning information and track information that is of a terminal and that is obtained in a last period. The period may be set by the CPD. As shown in FIG. 15, in step S1501, the CPD requests the LPD to output short-time positioning information and track information of a terminal. In step S1502, the LPD outputs the short-time positioning information and track information of the terminal to the CPD according to the request. A difference between FIG. 14 and FIG. 15 lies in that, in FIG. 14, the LPD proactively sends the short-time positioning information and track information to the CPD, and in FIG. 15, the CPD requests the LPD to report the short-time positioning information and track information. Signals sent by the LPD to the CPD include but are not limited to one or more of the following information: a two-dimensional or three-dimensional positioning result of the terminal device; an update time of a positioning result, which can be regarded as a time stamp; a speed of the terminal device; track information of the terminal device; local GIS information; and a positioning accuracy identifier.

In addition, the CPD may also send track information of the terminal device or large-range GIS information to the LPD.

Figure 16:
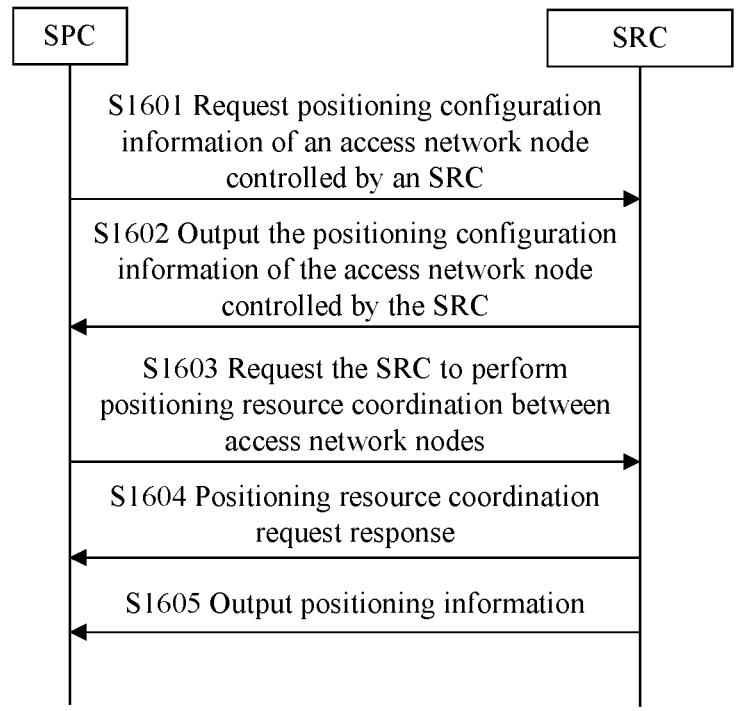
FIG. 16 is a flowchart of positioning configuration information interaction between an SPC and an SRC.

FIG. 16 is a flowchart of positioning configuration information interaction between an SPC and an SRC. As shown in FIG. 16, in step S1601, the SPC requests the SRC to send positioning configuration information, such as positioning signal configuration information, of an access network node controlled by the SRC. In step S1602, the SRC outputs the positioning configuration information of the access network node controlled by the SRC. In step S1603, the SPC requests the SRC to perform positioning resource coordination between access network nodes. In S1604, the SRC responds to a positioning resource coordination request. In S1605, after obtaining a terminal location through calculation, the SPC outputs positioning information to the SRC to help the SRC to optimize network performance.

Figure 17:
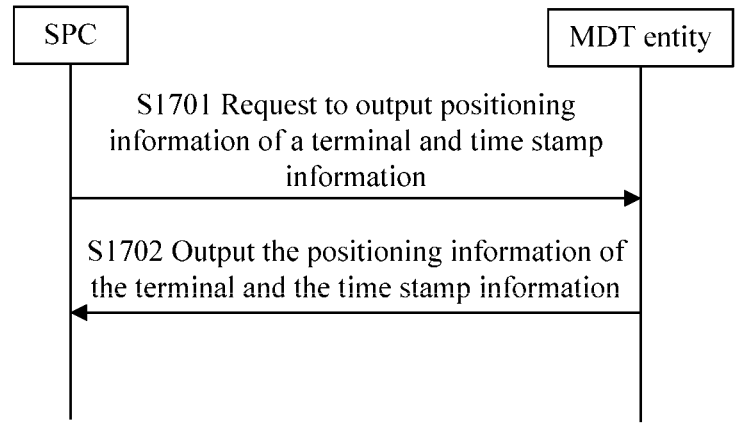
FIG. 17 is a flowchart of positioning information interaction between an SPC and an MDT entity.

FIG. 17 is a flowchart of positioning information interaction between an SPC and an MDT entity. As shown in FIG. 17, in step S1701, the MDT entity requests the SPC to output positioning information of a terminal and time stamp information bound with the positioning information. In step S1702, the SPC outputs the positioning information of the terminal and the time stamp information to the MDT entity.

Figure 18:
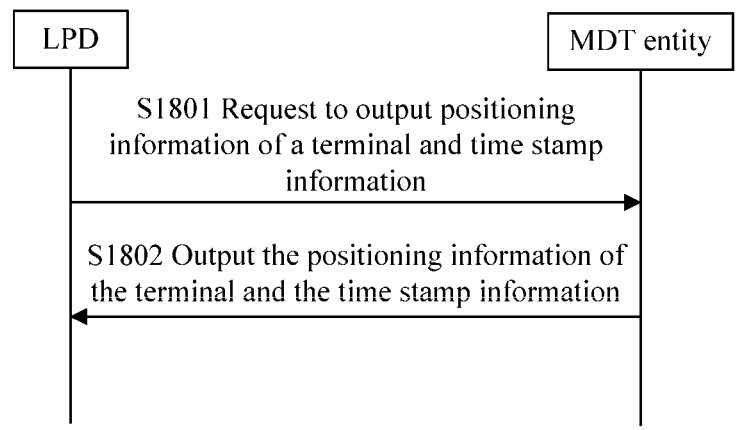
FIG. 18 is a flowchart of positioning information interaction between an LPD and an MDT entity.

FIG. 18 is a flowchart of positioning information interaction between an LPD and an MDT entity. As shown in FIG. 18, in step S1801, the MDT entity requests the LPD to output short-time positioning information and track information of a terminal and time stamp information bound with the positioning information. In step S1802, the LPD outputs, to the MDT entity, the short-time positioning information and track information of the terminal and the time stamp information bound with the positioning information.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the embodiments are only intended for describing the technical solutions of the present disclosure, but not for limiting the present disclosure. Although the present disclosure is described in detail with reference to the embodiments, a person of ordinary skill in the art should understand that they may still make modifications to the technical solutions described in the embodiments or make equivalent replacements to some or all technical features thereof. Therefore, the protection scope of the present disclosure shall be subject to the protection scope of the claims.

What is claimed is:

1. A single positioning controller apparatus, comprising:
a sending module, configured to send a positioning signal configuration request to a first access network node, wherein the positioning signal configuration request comprises at least one of the following information: frequency domain location configuration information of a positioning signal, time domain location configuration information of the positioning signal, period configuration information of the positioning signal, power configuration information of the positioning signal, or configuration information of a service signal in a positioning signal subframe;
a receiving module, configured to receive a positioning signal configuration feedback sent by the first access network node, wherein
the sending module is further configured to send, to the first access network node or to a first terminal device by using the first access network node, a first positioning measurement request that is based on at least one wireless positioning method, wherein the first positioning measurement request comprises instruction information for performing positioning measurement on the first terminal device, and the first access network node comprises at least one access network node of at least one radio access technology; and
the receiving module is further configured to receive at least one first positioning measurement result for the first terminal device that is sent by the first access network node or sent by the first terminal device by using the first access network node, wherein each first positioning measurement result is corresponding to one wireless positioning method; and
a processing module, configured to perform fusion calculation on the at least one first positioning measurement result, to obtain location information of the first terminal device.

2. The single positioning controller apparatus according to claim 1, wherein the sending module is further configured to send a reference signal configuration status enquiry to the first access network node or to the first terminal device by using the first access network node, wherein the reference signal configuration status enquiry is used to query a reference signal that has been configured by the first access network node or the first terminal device; and
the receiving module is further configured to receive a reference signal configuration status response that is sent by the first access network node or sent by the first terminal device by using the first access network node, wherein the reference signal configuration status response comprises the reference signal that has been configured by the first access network node or the first terminal device.

3. The single positioning controller apparatus according to claim 1, wherein the sending module is further configured to send an interference coordination configuration request to the first access network node, wherein the interference coordination configuration request is used to configure a positioning signal resource using manner for the first access network node; and
the receiving module is further configured to receive an interference coordination configuration response sent by the first access network node.

4. The single positioning controller apparatus according to claim 1, wherein the receiving module is further configured to: before the sending module sends, to the first access network node or to the first terminal device by using the first access network node, the first positioning measurement request that is based on the at least one wireless positioning method, receive a terminal device location information request sent by the first access network node, wherein the terminal device location information request is used to request the location information of the first terminal device.

5. The single positioning controller apparatus according to claim 1, wherein the sending module is further configured to send an over the top (OTT) information and terminal mode information request to the first terminal device by using the first access network node; and the receiving module is further configured to receive an OTT information and terminal mode information feedback that is sent by the first terminal device by using the first access network node.

6. The single positioning controller apparatus according to claim 1, wherein the sending module is further configured to send a first location information query request to a local positioning database (LPD) or a cloud positioning database (CPD), wherein the first location information query request comprises instruction information for querying short-time location information and short-time track information or long-time location information and long-time track information of the first terminal device; the LPD is configured to store the short-time location information and the short-time track information of the first terminal device; and the CPD is configured to store the long-time location information and the long-time track information of the first terminal device; and the receiving module is further configured to receive the short-time location information and the short-time track information of the first terminal device that are sent by the LPD or the long-time location information and the long-time track information of the first terminal device that are sent by the CPD, wherein the short-time location information and the short-time track information or the long-time location information and the long-time track information of the first terminal device are used to assist the processing module in obtaining the location information of the first terminal device.

7. The single positioning controller apparatus according to claim 6, wherein the sending module is further configured to send, to the LPD or the CPD, the location information of the first terminal device that is obtained by the processing module.

8. The single positioning controller apparatus according to claim 1, wherein the receiving module is further configured to receive a second location information query request sent by a minimization of drive tests (MDT) entity, wherein the second location information query request comprises location information for querying the first terminal device and time stamp information bound with the location information of the first terminal device; and the sending module is further configured to send, to the MDT entity, the location information of the first terminal device and the time stamp information bound with the location information of the first terminal device.

9. A positioning control system, comprising: a single positioning controller (SPC), a local positioning database (LPD), and a cloud positioning database (CPD), wherein the SPC comprises:

a sending module, configured to send, to a first access network node or to a first terminal device by using the first access network node, a first positioning measurement request that is based on at least one wireless positioning method, wherein the first positioning measurement request comprises instruction information for performing positioning measurement on the first terminal device, and the first access network node comprises at least one access network node of at least one radio access technology;

a receiving module, configured to receive at least one first positioning measurement result for the first terminal device that is sent by the first access network node or sent by the first terminal device by using the first access network node, wherein each first positioning measurement result is corresponding to one wireless positioning method; and a processing module, configured to perform fusion calculation on the at least one first positioning measurement result, to obtain location information of the first terminal device, wherein the sending module is further configured to send, to the LPD or the CPD, the location information of the first terminal device that is obtained by the processing module; the LPD is configured to store short-time location information and short-time track information of the first terminal device that are sent by the SPC; and the CPD is configured to store long-time location information and long-time track information of the first terminal device.

10. The positioning control system according to claim 9, wherein the sending module is further configured to send a positioning signal configuration request to the first access network node, wherein the positioning signal configuration request comprises at least one of the following information: frequency domain location configuration information of a positioning signal, time domain location configuration information of the positioning signal, period configuration information of the positioning signal, power configuration information of the positioning signal, and configuration information of a service signal in a positioning signal subframe; and the receiving module is further configured to receive a positioning signal configuration feedback sent by the first access network node.

11. The positioning control system according to claim 9, wherein the sending module is further configured to send a reference signal configuration status enquiry to the first access network node or to the first terminal device by using the first access network node, wherein the reference signal configuration status enquiry is used to query a reference signal that has been configured by the first access network node or the first terminal device; and the receiving module is further configured to receive a reference signal configuration status response that is sent by the first access network node or sent by the first terminal device by using the first access network node, wherein the reference signal configuration status response comprises the reference signal that has been configured by the first access network node or the first terminal device.

12. The positioning control system according to claim 9, wherein the sending module is further configured to send an interference coordination configuration request to the first access network node, wherein the interference coordination configuration request is used to configure a positioning signal resource using manner for the first access network node; and the receiving module is further configured to receive an interference coordination configuration response sent by the first access network node.

13. The positioning control system according to claim 9, wherein the receiving module is further configured to: before sending, to the first access network node or to the first terminal device by using the first access network node, the first positioning measurement request that is based on the at least one wireless positioning method, receive a terminal device location information request sent by the first access network node, wherein the terminal device location information request is used to request the location information of the first terminal device.

14. The positioning control system according to claim 9, wherein the sending module is further configured to send an over the top (OTT) information and terminal mode information request to the first terminal device by using the first access network node; and the receiving module is further configured to receive an OTT information and terminal mode information feedback that is sent by the first terminal device by using the first access network node.

15. The positioning control system according to claim 9, wherein the sending module is further configured to send a first location information query request to the LPD or the CPD, wherein the first location information query request comprises instruction information for querying the short-time location information and the short-time track information or the long-time location information and the long-time track information of the first terminal device; and the receiving module is further configured to receive the short-time location information and the short-time track information of the first terminal device that are sent by the LPD or the long-time location information and the long-time track information of the first terminal device that are sent by the CPD, wherein the short-time location information and the short-time track information or the long-time location information and the long-time track information of the first terminal device are used to assist the processing module in obtaining the location information of the first terminal device.

16. The positioning control system according to claim 9, wherein the receiving module is further configured to receive a second location information query request sent by a minimization of drive tests (MDT) entity, wherein the second location information query request comprises location information for querying the first terminal device and time stamp information bound with the location information of the first terminal device; and the sending module is further configured to send, to the MDT entity, the location information of the first terminal device and the time stamp information bound with the location information of the first terminal device.

17. The positioning control system according to claim 9, wherein the LPD is further configured to send the short-time location information and the short-time track information of the first terminal device to the CPD; and the CPD is further configured to update the long-time location information and the long-time track information of the first terminal device based on the short-time location information and the short-time track information of the first terminal device.

18. The positioning control system according to claim 17, wherein the CPD is further configured to send a short-time location information and short-time track information query request to the LPD.

19. The positioning control system according to claim 9, wherein the LPD is further configured to send a long-time location information and long-time track information query request to the CPD;

the CPD is further configured to send the long-time location information and the long-time track information of the first terminal device to the LPD; and the LPD is further configured to update the short-time location information and the short-time track information of the first terminal device based on the long-time location information and the long-time track information of the first terminal device.

20. A control method comprising:

sending a positioning signal configuration request to a first access network node, wherein the positioning signal configuration request comprises at least one of the following information: frequency domain location configuration information of a positioning signal, time domain location configuration information of the positioning signal, period configuration information of the positioning signal, power configuration information of the positioning signal, or configuration information of a service signal in a positioning signal subframe;

receiving a positioning signal configuration feedback sent by the first access network node, wherein sending, to the first access network node or to a first terminal device by using the first access network node, a first positioning measurement request that is based on at least one wireless positioning method, wherein the first positioning measurement request comprises instruction information for performing positioning measurement on the first terminal device, and the first access network node comprises at least one access network node of at least one radio access technology; and receiving at least one first positioning measurement result for the first terminal device that is sent by the first access network node or sent by the first terminal device by using the first access network node, wherein each first positioning measurement result is corresponding to one wireless positioning method; and performing fusion calculation on the at least one first positioning measurement result, to obtain location information of the first terminal device.

* * * * *